(12) United States Patent
Van Eijk et al.

(10) Patent No.: US 6,251,444 B1
(45) Date of Patent: Jun. 26, 2001

(54) DOUGH PRODUCT AND METHOD FOR IMPROVING BREAD QUALITY

(75) Inventors: Jan Henricus Van Eijk, Bilthoven; Cees Docter, Delft, both of (NL)

(73) Assignee: DSM N.V. (NL)

(*) Notice: Subject to any disclaimer, the term of this patent is extended or adjusted under 35 U.S.C. 154(b) by 0 days.

(21) Appl. No.: 08/097,646

(22) Filed: Jul. 26, 1993

(30) Foreign Application Priority Data

Jul. 27, 1992 (EP) ................................. 92202315

(51) Int. Cl.$^7$ ...................................... A21D 2/00
(52) U.S. Cl. ................. 426/20; 426/18; 426/19; 426/549
(58) Field of Search ................. 426/20, 18, 19, 426/549

(56) References Cited

U.S. PATENT DOCUMENTS

| | | | |
|---|---|---|---|
| 3,615,687 | * 10/1971 | Mochizuki et al. | 426/52 |
| 4,004,976 | * 1/1977 | Isaac | 435/267 |
| 4,032,318 | * 6/1977 | Lovness | 71/9 |
| 4,160,848 | 7/1979 | Vidal et al. | |
| 4,337,077 | * 6/1982 | Rutherford | 71/6 |
| 4,983,408 | * 1/1991 | Colton | 426/45 |
| 5,698,245 | * 12/1997 | Tanaka et al. | 426/10 |

FOREIGN PATENT DOCUMENTS

| | | |
|---|---|---|
| 913066692 | 1/1992 | (EP) . |
| 912028412 | 5/1992 | (EP) . |

OTHER PUBLICATIONS

Food Formulating, Mar. 1995, Novo NOrdisk Bioindustrials, 33.

Si, J.Q., New Developments of Enzymes for the Baking Industry, Nov. 1995, p. 13–29 Conference, VI Jornadas de Aplicaciones Industriales de las Enzimas.

* cited by examiner

*Primary Examiner*—Leslie Wong
(74) *Attorney, Agent, or Firm*—Bierman, Muserlian and Lucas

(57) ABSTRACT

The present invention relates to a bread improver composition containing lipase, hemicellulase and amylase, preferably in combination with shortening. The enzyme preparation of the invention has an advantageous effect on the crumb softness of the final bakery product. The combination of the enzyme preparation of the invention and shortening can replace emulsifiers like SSL and monoglycerides which are used as a crumb softener.

5 Claims, No Drawings

DOUGH PRODUCT AND METHOD FOR IMPROVING BREAD QUALITY

The present invention relates to a bread improver composition and to a method of using the composition to improve bread quality.

Bread improvers are complex mixtures containing various functional ingredients such as oxidizing and reducing agents (e.g. ascorbic acid, cysteine), enzymes (e.g. α-amylase, hemicellulase), emulsifiers (e.g. DATA-ester, monoglycerides, SSL), fatty materials (e.g. fat, lecithin) and carriers or bulk materials (starch, sugars, etc). Many of the commonly used bread improvers contain emulsifiers which are used for improving dough strength and crumb softness. From the consumer's point of view it is advantageous to minimize the use of emulsifiers, which are considered as chemical additives. The resistance of consumers to chemical additives is growing and there is therefore constant need to replace emulsifiers by consumer friendly additives and/or enzymes, which are considered as processing aids. However, bread quality is lowered considerably when emulsifiers are omitted, for example, it is difficult to achieve a shelf life of 3 to 5 days for noncrusty types of bread such as sandwich breads without using emulsifiers like SSL or monoglycerides.

Studies on bread staling have indicated that the starch fraction in bread recrystallizes during storage, thus causing an increase in crumb firmness. Amylases and hemicellulases are widely used in bread improvers to improve crumb softness and loaf volume. α-Amylases partially degrade the starch fraction during baking and increase crumb softness. Hemicellulases break down the hemicellulose fraction of wheat flour, thus releasing water normally bound to this fraction into the dough. The use of hemicellulases in bread improvers results in an improved oven spring of the dough during baking, an improved loaf volume, grain structure and better keeping quality of the baked bakery product. However, the combined improvements imparted by amylases and hemicellulases are limited and therefore emulsifiers are still required for obtaining an acceptable keeping quality of bread.

Lipases are rarely used in bread improvers and detrimental effects have been observed from the action of endogenous lipase liberating unsaturated fatty acids into the dough (Pyler 1988).

Surprisingly it has been found that the combined use of a hemicellulase, an amylase, preferably an α-amylase, a lipase and preferably shortening has a complementary synergistic effect in such a way that loaf volume and crumb softness of the bread is clearly better than when each of the enzymes is used individually. The excellent crumb softness of bread obtained by addition of this combination of enzymes and shortening allows a complete elimination of emulsifiers without lowering the quality of the bread.

The present invention provides a bread improver composition which comprises at least one lipase, at least one hemicellulase and at least one amylase.

The present invention further provides a dough which comprises the bread improver composition, flour, water and yeast.

The dough of the invention may be baked to produce bread of improved quality and crumb softness.

The dough may further comprise shortening, preferably 100 g or less of shortening per kilogram flour, for example 15 to 50 g of solid shortening per kilogram flour.

The dough may further comprise oxidizing and reducing agents. Preferably ascorbic acid is used as an oxidant in amounts of 0.15 g or less per kg of flour. Preferably L-cysteine is used as a reducing agent in amounts less than 0.05 g per kg of flour.

The dough of the invention may also comprise salt, sugar, or other normal dough ingredients.

The dough of the present invention is prepared without adding conventional emulsifiers such as monoglycerides (GMS), diacetyl tartaric acid esters of mono- and diglycerides (DATA-esters) and the sodium or calcium salt of stearic acids (SSL/CSL).

The amounts of the various enzymes to be included in the dough vary depending on various factors such as enzyme activity, baking method, kind of bread, fermentation time and temperature and the kind of raw materials used. It will be appreciated that the skilled person is able without undue experimentation to determine the effective amounts of the enzymes in question.

According to the present invention the dough comprises from 25–1250 FAU fungal amylase units (FAU) per kg flour, more preferably between 75–250 FAU per kg flour. The amylase is generally fungal amylase for example from a strain of *Aspergillus oryzae*. The fungal amylase activity is measured at pH=5.5 and 30° C. using Phadebas tablets (Pharmacia) as a substrate and a fungal amylase preparation of 10.000 FAU/g as an internal reference [1 F(ungal) A(mylase) U(nit)is equivalent to 10 SKB-units].

According to the present invention hemicellulase is added preferably in an amount varying between 25–500 β-xylanase units per kg flour, more preferably between 35–280 β-xylanase units per kg flour. The hemicellulase is preferably fungal hemicellulase, for example from Aspergillus or Trichoderma strains. The hemicellulase activity is determined at pH=4.7 and 40° C. on a dyed xylan substrate (Xylazyme tablets from MegaZyme Inc. Australia). one β-xylanase unit is defined as the amount of enzyme required to release one micromole of xylose reducing equivalents per minute under the defined assay conditions.

According to the present invention lipase is added preferably in an amount varying between 400–4000 lipase nits per kg of flour, more preferably between 800–2000 lipase units per kg of flour.

The lipase is preferably fungal lipase produced by a Rhizopus, Aspergillus, Candida, Penicillium or Mucor strain. Preferably a lipase from a strain of *Rhizopus arrhizus* or *Rhizopus oryzae* is used. The lipase activity is determined in a titrimetric test method at 37° C. and pH=6.0 using an oil in water emulsion of olive oil as a substrate. One lipase unit is defined as the amount of enzyme required to liberate one micromole of fatty acid per minute under the defined assay conditions.

The present invention will be further demonstrated by the following examples. It should be noted that the present invention is by no means limited to these examples.

EXAMPLE 1

Preparation of White Pan Bread (no-time straight dough method) and Measurement of Crumb Firmness For bread making a dough was prepared from 3500 g of flour (100%), 1960 ml water (55%), 87.5 g compressed yeast (2.5%), 52.5 g sugar (1.5%), 70 g salt (2%), 0–175 g of shortening (0–5%), 105 mg ascorbic acid (30 ppm), 70 mg L-cysteine (20 ppm) and various quantities of the enzymes indicated in the Tables. The ingredients were mixed into a dough using a Kemper spiral mixer (350 rotations at speed 1 followed by 1200 rotations at speed 2).

Dough pieces of 900 g were rounded by hand, proofed for 35 minutes at 30° C., punched, moulded, panned, proofed for 65 minutes at 34° C. and baked for 30 minutes in an oven at 220° C. Loaf volume was determined by rapeseed displacement method. After storing the loaves for three days in polyethylene bags at room temperature crumb firmness was measured using a Stevens Texture Analyser. Two slices of 2 cm thickness from the center of each loaf were analysed by the texture analyser using a probe of 1.5 inch diameter, a compression depth of 5 mm (25%) and a rate of compression of 0.5 mm/sec.

Table 1 shows the results of baking test using various amounts of shortening, emulsifier (distilled monoglycerides), hemicellulase, lipase and amylase. It appears from Table 1 that addition of a combination of shortening, α-amylase, hemicellulase and lipase results in excellent bread quality and superior crumb softness. The crumb softness obtained with this combination is superior to the crumb softness obtained with 0.5% distilled monoglycerides. It is apparent, therefore, that excellent bread quality is obtained when using this enzyme combination without an emulsifier.

TABLE 1

| | Addition | loaf volume (ml) | crumb firmness after 72 hours (g) |
|---|---|---|---|
| 1. | shortening (0%) | 3500 | 900 |
| 2. | shortening (0%) distilled monoglycerides (0.5%) | 3500 | 720 |
| 3. | shortening (0%) lipase (2000 U/kg flour) | 3200 | 950 |
| 4. | shortening (0%) fungal amylase (90 FAU/kg flour) hemicellulase (105 U/kg flour) | 3800 | 650 |
| 5. | shortening (0%) fungal amylase (90 FAU/kg flour) hemicellulase (105 U/kg flour) lipase (2000 U/kg flour) | 3300 | 950 |
| 6. | shortening (3%) | 3600 | 710 |
| 7. | shortening (3%) distilled monoglycerides (0.5%) | 3600 | 550 |
| 8. | shortening (3%) lipase (2000 U/kg flour) | 3600 | 560 |
| 9. | shortening (3%) fungal amylase (90 FAU/kg flour) hemicellulase (105 U/kg flour) | 4050 | 450 |
| 10. | shortening (3%) fungal amylase (90 FAU/kg flour) hemicellulase (105 U/kg flour) lipase (2000 U/kg flour) | 4100 | 350 |

EXAMPLE 2

Baking tests were carried out as described in Example 1. A recipe containing 3% shortening was used throughout this baking test and crumb firmness of the breads was measured as described in Example 1.

Table 2 shows the result of the baking test using various emulsifiers and enzyme combinations. Superior bread quality is obtained when adding a combination of amylase, hemicellulase and lipase. This Example demonstrates that bread improvers containing this enzyme combination have better performance than bread improvers containing conventional emulsifiers like SSL, DATA-esters or monoglycerides.

TABLE 2

| | Addition | loaf volume (ml) | crumb firmness after 72 hours (g) |
|---|---|---|---|
| 1. | fungal amylase (30 FAU/kg flour) hemicellulase (35 U/kg flour) distilled monoglycerides (0.15%) | 3700 | 580 |
| 2. | fungal amylase (90 FAU/kg flour) hemicellulase (105 U/kg flour) distilled monoglycerides (0.45%) | 3900 | 400 |
| 3. | fungal amylase (30 FAU/kg flour) hemicellulase (35 U/kg flour) SSL (0.1%) | 3850 | 520 |
| 4. | fungal amylase (90 FAU/kg flour) hemicellulase (105 U/kg flour) SSL (0.3%) | 3950 | 415 |
| 5. | fungal amylase (30 FAU/kg flour) hemicellulase (35 U/kg flour) DATA-ester (0.1%) | 3950 | 500 |
| 6. | fungal amylase (90 FAU/kg flour) hemicellulase (105 U/kg flour) DATA-ester (0.3%) | 4000 | 410 |
| 7. | fungal amylase (30 FAU/kg flour) hemicellulase (35 U/kg flour) lipase (1000 U/kg flour) | 3900 | 450 |
| 8. | fungal amylase (90 FAU/kg flour) hemicellulase (105 U/kg flour) lipase (3000 U/kg flour) | 4100 | 320 |

EXAMPLE 3

Breads were baked with variable amounts of shortening and enzyme combination comprising fungal amylase (90 FAU/kg flour), hemicellulase (105 U/kg flour) and lipase (3000 U/kg flour). The results (see Table 3) show that the amount of shortening in the recipe is critical for obtaining the desired bread quality. Best results are obtained when using high levels of shortening, whereas solid shortening gives better results than liquid oil.

TABLE 3

| Addition | loaf volume (ml) | crumb firmness after 72 hours (g) |
|---|---|---|
| 1. shortening (0%) | 3250 | 900 |
| 2. shortening (1%) | 3900 | 450 |
| 3. soy bean oil (1%) | 3400 | 790 |
| 4. shortening (3%) | 4100 | 350 |
| 5. shortening (5%) | 4050 | 330 |

EXAMPLE 4

White pan bread was prepared according to the following recipe for a sponge and dough process:

| Sponge | Flour | 70% |
|---|---|---|
| | Yeast | 2% |
| | Yeast food | 0.3% |
| | Water | 38.5% |
| Dough | Flour | 30% |
| | Water | 16.5% |
| | Sugar | 5% |
| | Salt | 2% |
| | Milkpowder | 4% |
| | Shortening | 5% |

The sponge was prepared by mixing the ingredients into a dough using a Kemper spiral mixer (380 rotations at speed 1 followed by 700 rotations at speed 2). After a sponge fermentation of 4 hours at 28° C. the sponge was returned into the mixer bowl, all of the dough ingredients were added and mixed into a dough (280 rotations at speed 1 followed by 700 rotations at speed 2 in the Kemper spiral is mixer).

The dough of 29° C. temperature was divided immediately after mixing into pieces of 620 g which were proofed during 25 minutes at 31° C., moulded, panned, proofed for 65 minutes at 43° C. and baked for 25 minutes at 190° C. Crumb firmness was measured after 3 days storage according to the procedure described in Example 1. The results (Table 4) show that superior bread quality is obtained in a sponge and dough process, when adding a combination of lipase, hemicellulase and amylase at this dough site.

TABLE 4

| | Addition (at dough site) | loaf volume (ml) | crumb firmness after 72 hours (g) |
|---|---|---|---|
| 1. | fungal amylase (112.5 FAU/kg flour) | 2875 | 530 |
| 2. | fungal amylase (112.5 FAU/kg flour) distilled mono-glycerides (0.3%) | 2870 | 440 |
| 3. | fungal amylase (112.5 FAU/kg flour) hemicellulase (112 U/kg flour) | 2950 | 480 |
| 4. | fungal amylase (112.5 FAU/kg flour) hemicellulase (112 U/kg flour) lipase (1200 U/kg flour) | 3000 | 360 |

What is claimed is:

1. A dough free of emulsifiers comprising flour, water, yeast, 1% –5% (w/w) shortening and a bread improving composition comprising 25 to 1250 fungal amylase units (FAU) of α-amylase, 450 to 4000 units of lipase, hemicellulase in 25 to 500 β-xylanase units, wherein all enzymes are quantitated as units per kg of flour of the dough to be formed is free of emulsifiers resulting in a bread improving composition.

2. A dough of claim 1 containing 75 to 250 FAU of α-amylase per kg of flour.

3. A dough of claim 1 containing 35 to 250 β-xylanse units of hemicellulase per kg of flour.

4. A dough of claim 1 containing 500 to 2500 units of lipase per kg of flour.

5. A process for producing bread which comprises forming a dough as claimed claim 1 and baking the dough.

* * * * *